UNITED STATES PATENT OFFICE.

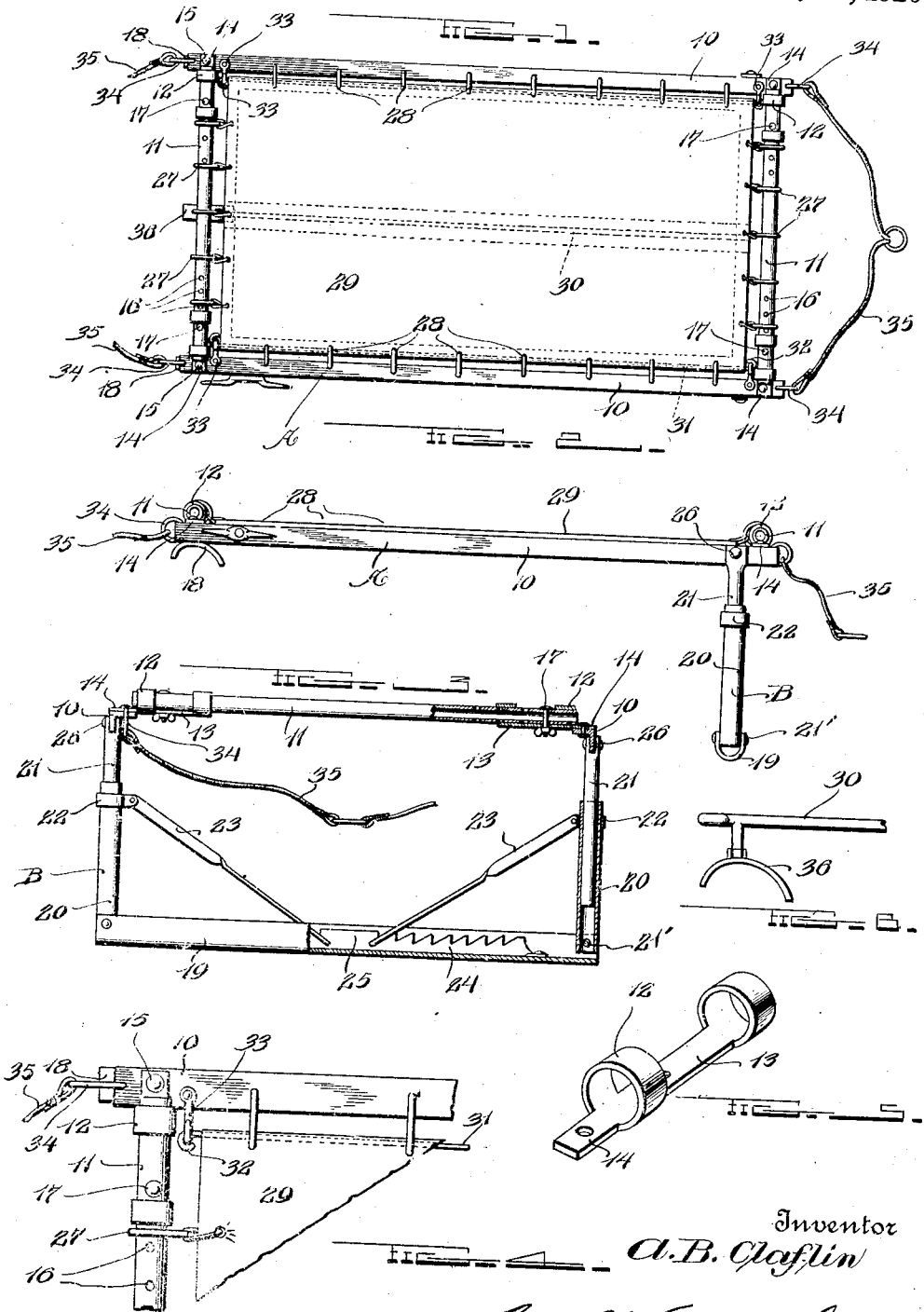

ALBERT B. CLAFLIN, OF TOLEDO, OREGON.

HAMMOCK OR BED CONSTRUCTION.

1,340,015.   Specification of Letters Patent.   Patented May 11, 1920.

Application filed December 9, 1919. Serial No. 343,670.

*To all whom it may concern:*

Be it known that I, ALBERT B. CLAFLIN, a citizen of the United States, residing at Toledo, in the county of Lincoln and State of Oregon, have invented certain new and useful Improvements in Hammock or Bed Construction, of which the following is a specification.

The invention relates to a hammock or bed construction adaptable for use in automobiles or other like vehicles.

The primary object of the invention is the provision of a hammock or bed of this character, wherein the same can be positioned within the body of an automobile and supported by the rear seat therein so that said hammock or bed can be occupied for sleeping purposes, the bed or hammock being of novel construction to permit the adjustment thereof for varying the size of the same and also to permit the disposition thereof within automobiles of variable sizes.

Another object of the invention is the provision of a hammock or bed of this character, wherein the same when not in use can be conveniently stored within the body of an automobile and when set up for use will be rigid and strong for the carriage of its occupants, the bed or hammock being adaptable for use either within the automobile body or outside of the same at the option of the user.

A further object of the invention is the provision of a hammock or bed of this character, wherein the construction thereof permits the same to be knocked down so that it may be readily carried when touring with an automobile, it being simple in construction, readily and easily adjusted with despatch, strong, durable and inexpensive to manufacture.

With these and other objects in view the invention consists in the features of construction, combination and arrangement of parts, as will be hereinafter fully described, illustrated in the accompanying drawing and pointed out in the claim hereunto appended.

In the accompanying drawing:

Figure 1 is a top plan view of the hammock or bed constructed in accordance with the invention.

Fig. 2 is a side elevation thereof.

Fig. 3 is an end elevation showing a portion thereof broken away.

Fig. 4 is an enlarged fragmentary plan view showing in detail the fastening of the flexible section to the frame of the hammock or bed.

Fig. 5 is a detail perspective view of one of the connecting flaps of the frame of the hammock or bed.

Fig. 6 is a fragmentary side elevation in detail of one of the rests for the hammock or bed.

Similar reference characters indicate corresponding parts throughout the several views in the drawing.

Referring to the drawing in detail the hammock or bed comprises a substantially rectangular shaped frame A, having at one end an adjustable support B, the frame includes angle bars 10 disposed in spaced parallel relation to each other and pivoted near opposite ends of these bars are connectors for tubular end rails 11, each connector being in the form of spaced collars 12 joined through the medium of a web 13, which provides a terminal ear 14 for the pivot 15 connecting it to the adjacent side rail or bar 10 and within these collars 12 of the connectors are received the tubular end rails 11 which latter are provided with spaced vertical holes 16 to accommodate a detachable bolt member 17, any one of the holes being adaptable to receive the said bolt members 17 which are preferably four in number and each is adapted to engage in the web 13 of the adjacent connector so that in this manner the end rails 11 are adjustably connected with the side bars 10 of the frame A, thus it being seen that the frame can be varied in width to increase or decrease the capacity thereof for occupancy by either one or several persons.

On the side bars 10 of the frame A at one end thereof are suitable fastener rests 18 of upwardly bowed formation to brace and engage over the top edge of a seat within an automobile body or other like vehicle, these rests being preferably engaged with the rear seat of the body of the automobile or other like vehicle and in this manner the frame is supported at one end thereof while the support B is at the other end and is adapted to rest upon the front seat of the automobile or other like vehicle, the details of the support B being hereinafter fully described.

The support B comprises a channeled bottom rail 19 in which are fitted at opposite ends the tubular lower sections 20 of adjustable legs, the upper sections 21 of which telescope within said sections 20, which latter are pivoted at 21' to the channeled rail 19. Embracing the sections 20 are collars 22 to which are pivoted braces 23 the free ends of which are adapted to adjustably engage in rack teeth 24 formed in a rack bar 25 fixed in the channeled rail 19 as is clearly shown in Fig. 3 of the drawing and in this manner the braces can be properly adjusted as will be clearly apparent. The section 21 of the legs of the support B are swingingly fastened at 26 to the side bars 10 of the frame A of the hammock or bed.

Loosely engaged upon the end rails 11 are rings 27 and likewise loosely engaged in the side bars 10 are rings 28, the same being engaged with a flexible section 29 preferably made from canvas which constitutes the supporting web of the hammock or bed, the section 29 being reinforced medially through the medium of a center rod 30 and outer side rods 31, the latter being formed with hook ends 32 engaged with keeper hooks 33 carried by the side bars 10 of the frame A.

On the ends of the side bars 10 of the frame A adjacent to the support B are rings 34 to which are connected the ends of a hammock loop or hanger 35 so that this end of the frame A can be suspended from a support or the like if desired outside of the automobile body while the other end can rest upon the side foot of said automobile if desired.

It is of course to be understood that rings 34 can be mouned at opposite ends of the side bars 10 and the loop or hanger 35 engaged therewith for the suspension of the hammock or bed from several supports similar to an ordinary hammock and this is optional with the user.

Supplementing the rests 18 is an intermediate rest 36 which is connected with the median rod 30 as shown in Fig. 6 of the drawing.

From the foregoing it is thought that the construction and manner of use of the invention will be clearly understood and therefore a more extended explanation has been omitted.

What is claimed is:

A hammock or bed construction comprising spaced side rails, connectors engaged with the side rails, tubular end rails adjustably engaged in the connectors, means for fastening the end rails to said connectors, a flexible web engaged with the rails, rests at one end of the side rails, extensible supports connected with the side rails at the other ends thereof, adjustable braces in said support and a bottom channeled rail included in said support and having a toothed rack to be adjustably engaged by the braces.

In testimony whereof, I affix my signature hereto.

ALBERT B. CLAFLIN.